May 23, 1944.  K. W. HARPER  2,349,424
OPTICAL INSTRUMENT
Filed Oct. 9, 1942  2 Sheets-Sheet 1
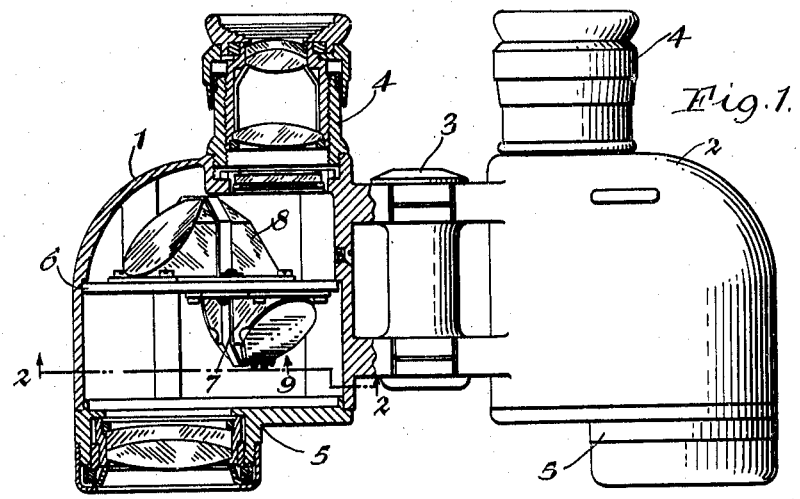
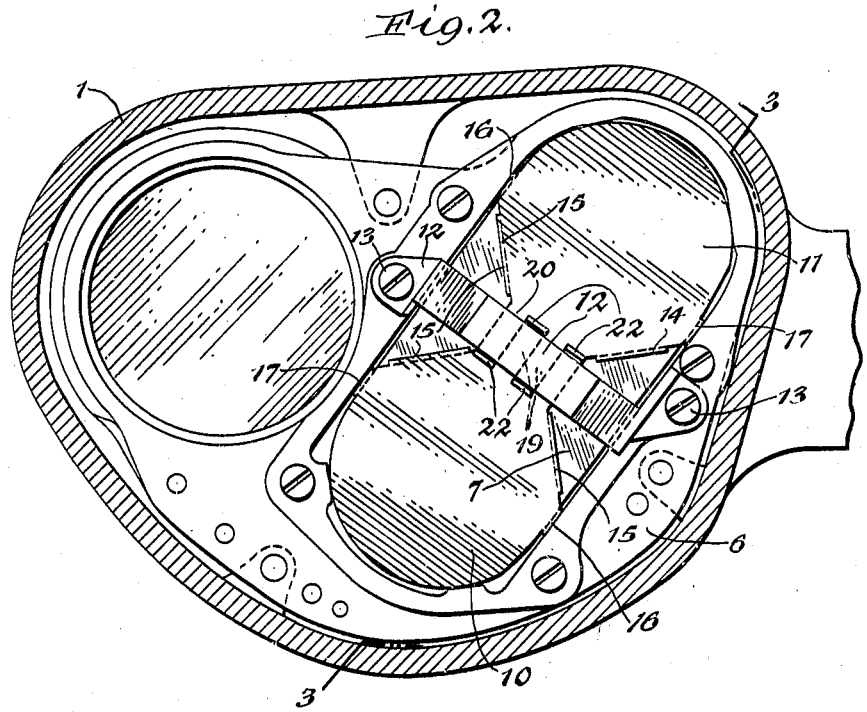
INVENTOR.
KENNARD W. HARPER
BY
*Raymond A. Paquin*
ATTORNEY May 23, 1944.    K. W. HARPER    2,349,424
OPTICAL INSTRUMENT
Filed Oct. 9, 1942    2 Sheets-Sheet 2
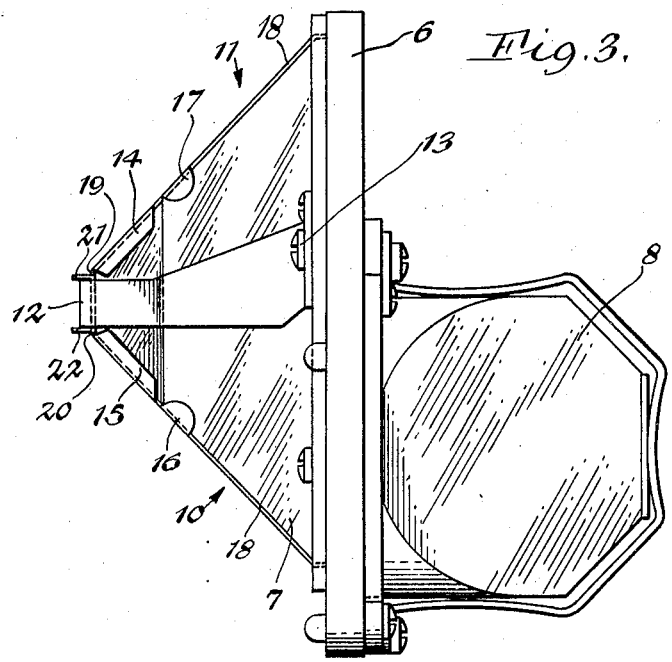
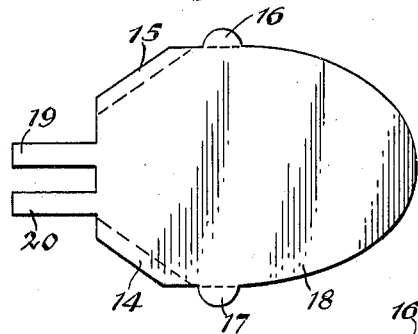
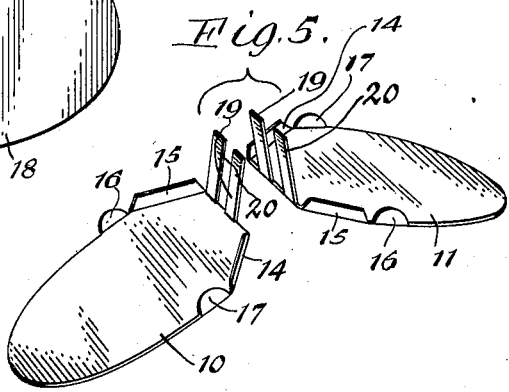
INVENTOR.
KENNARD W. HARPER
BY
ATTORNEY Patented May 23, 1944

2,349,424

UNITED STATES PATENT OFFICE 2,349,424

OPTICAL INSTRUMENT

Kennard W. Harper, East Aurora, N. Y., assignor to Spencer Lens Company, Buffalo, N. Y., a corporation of New York Application October 9, 1942, Serial No. 461,643

5 Claims. (Cl. 88—33)

This invention relates to improvements in prismatic instruments such as binoculars or the like and has particular reference to a new and improved type of light shield for the prism elements of such instrument.

One of the objects of the invention is to provide a light shield for a prism or the like which may be adjusted to fit the particular prism and which is simple, efficient and economical to manufacture and assemble.

Another object of the invention is to provide a device of the type set forth which may be fitted to the individual prism or the like.

Another object of the invention is to provide a device of the type set forth which may be locked in adjusted position.

Other objects and advantages of the invention will be apparent from the following description taken in connection with the accompanying drawings. It will be understood that many changes may be made in the details of construction and arrangement of parts without departing from the spirit of the invention as expressed in the accompanying claims. I therefore do not wish to be limited to the exact details of construction and arrangement of parts shown and described as the preferred form has been shown by way of illustration only.

Fig. 1 is a plan view partially in section of a prism binocular embodying the invention.

Fig. 2 is a sectional view on an enlarged scale taken on line 2—2 of Fig. 1 looking in the direction of the arrows.

Fig. 3 is a sectional view of the prism supporting arrangement shown in Figs. 1 and 2 taken on line 3—3 of Fig. 2 looking in the direction of the arrows.

Fig. 4 is a view of one of the light shields during the process of formation thereof; and Fig. 5 is a perspective view of a pair of the light shields but in inverted position.

In the construction of prismatic instruments such as binoculars or the like it is frequently desirable that at least one of the prisms is provided with a light shield to prevent the entrance of extraneous light through said prism into the eyepiece of the instrument. In the past such light shields have been formed from a single piece of material and have comprised two shield portions connected by a neck portion and due to variations in the size of the finished prisms frequently the extraneous light entered around said light shield and through said prism and entered the eyepiece and optical system and interfered with the use of the instrument. Due to the construction thereof, said light shields could not be accurately fitted to the prism to compensate for said variations without considerable time and effort. It is therefore one of the objects of this invention to provide a new and improved light shield or the like which is simple, efficient and economical in manufacture and assembly and which may be so positioned on the prism as to compensate for variations in the manufacture or size thereof and which may be locked in said adjusted position.

Referring more particularly to the drawings wherein similar reference characters designate corresponding parts throughout the several views the device shown embodying the invention is a prism binocular comprising a pair of casings 1 and 2 pivotally connected by the hinge member 3. Each of said casings 1 and 2 has attached thereto an eyepiece 4 and an objective member 5. In each of said casings 1 and 2 there is provided a prism plate or support 6 adapted to retain the prisms 7 and 8 in optical alignment with each other and with said eyepiece 4, and objective 5. As will be seen from the casing 1 in Fig. 1 the light enters the instrument through the objective lens in the objective member 5 and then enters the prism 8 through an opening in the prism plate or support 6 and is then reflected by said prism 8 through another opening in the prism plate or support 6 into the prism 7 and then through a further opening of said prism or support 6 to the eyepiece of the instrument.

It is pointed out that unless a light shield is placed over the prism 7 that extraneous light entering the body of the instrument through the objective lens in the objective 5 may pass directly through said prism 7 and opening in the prism plate or support 6 into the eyepiece 4 and interfere with vision through the instrument.

The light shield 9 is comprised of the members 10 and 11, each adapted to fit over one of the sides of the prism and to be held in position by the strap member 12 which has its ends secured to the prism plate or support 6 by the screws or the like 13.

In forming the said light shield members 10 and 11 said members are first stamped or blanked out in the form shown in Fig. 4 and then each of the flanges 14, 15, 16 and 17 are bent in a direction substantially 90° to the body portion 18 of said member in order that said bent portions may engage the periphery of the prism to retain the light shield member over the prism face.

The said shield member is also provided with the projecting members 19 and 20 formed integral therewith and which members may be of any desired number or length. The projections 19 and 20 are also bent to such angular relation with the body 18 of said shield member so as to lie flat across the upper edge of the prism when the shield is being adjustably positioned thereon and are adapted to be positioned under the strap 12 and to be retained in position by said strap 12 and are adapted to interfit between similar projections on the other of said shield members.

After the light shield members are placed one on each face of the prism with said projections in said interfitted relation and the body portion 18 fitted to overlie the prism face, the prism straps 12 are secured by the screws 13 in position over said prism and projections 19 and 20 and the projecting portions 21 and 22 of each of said pair of portions 19 and 20 are bent by pliers or the like to the position shown in Fig. 3 that is, to a position at an angle of approximately 90° with respect to the remaining portions of said projections 19 and 20 and so as to engage the opposite sides of said strap 12 and thereby be retained in adjusted position.

It is pointed out that with the construction shown and described in this application it is possible to adjust the light shield body portion 18 and deflected portions 14, 15, 16 and 17 to compensate for variations in size of the various prisms such as the size of the prism face, or the distance between the prism faces etc. and therefore it is possible to quickly, simply and easily adjust said shields so as to prevent any extraneous light entering the prism through the sides thereof covered by said shields.

In the process of manufacture the light shield members are first stamped out as described above and as shown in Fig. 4 and then the flanges and projecting members are bent as also described above and as shown in Fig. 5. When assembling the prism on its mount, a pair of the shield members such as shown in inverted position in Fig. 5 are first placed on said prism with the projections 19 and 20 each interfitting in the space between the projections on the opposite shield member and each shield is then adjusted to fit its respective prism face and then the strap member 12 is positioned thereover and the screws 13 tightened to retain said strap in position over said prism and shields. Then the projecting end portions of said projections 19 and 20 are bent to the position shown in Fig. 3 and as described above, and then the prism assembly is positioned into the instrument.

From the foregoing it will be seen that I have provided simple, efficient and economical means for obtaining all of the objects and advantages of the invention.

Having described my invention, I claim:

1. In a device of the character described in combination with an optical element, a support and means to retain said optical element on said support, of a light shield for said optical element, said light shield comprising a pair of separate shield members having integral opposed projection portions, said shield members being in opposed relation with said projection portions in adjacent relation and said securing means extending over said projection portions to retain said shield members on said optical element.

2. In a device of the character described in combination with an optical element, a support for said optical element and means for retaining said optical element on said support of a light shield for said optical element, said shield comprising a plurality of separate opposed shield members each adapted to overlie a portion of said optical element and each having integral projection portions on their adjacent edges with said projection portions engaging said means for retaining said optical element on its support for retaining said shield on said optical element.

3. In a device of the character described in combination with an optical element, a support for said optical element and means for retaining said optical element on said support, of a light shield for said optical element, said light shield comprising two separate shield members in opposed relation each having means for adjustably positioning said shield on said optical element and each having a projection portion with said projection portions being in adjacent relation and adapted to engage said means for retaining said optical element on its support to retain said light shield on said optical element.

4. In a device of the character described in combination with an optical element, a support for said optical element, a strap member adapted to overlie said optical element, of a light shield comprising a pair of separate shield members in opposed relation with each shield member having a portion adapted to overlie a portion of said optical element and each having a projection portion with said projection portions being in adjacent relation and adapted to be retained in said position by said strap member to retain said shield members on said optical element.

5. In a device of the character described in combination with an optical element, a support for said optical element, a strap member adapted to overlie said optical element of a light shield comprising a plurality of separate shield members in opposed relation with each shield member having a portion adapted to overlie a portion of said optical element and each having a projection portion with said projection portions being in adjacent relation and adapted to engage said strap member to retain said shield member on said optical element and each of said projecting members having a deflected end portion for engaging said strap member for retaining said light shield members in adjusted position.

KENNARD W. HARPER.